Patented Jan. 4, 1938

2,104,168

UNITED STATES PATENT OFFICE 2,104,168

ARTIFICIAL SUBSTANCE

Otto Röhm and Walter Bauer, Darmstadt, Germany, assignors, by mesne assignments, to Röhm & Haas Company, Philadelphia, Pa., a corporation of Delaware No Drawing. Application May 29, 1930, Serial No. 457,494. In Germany June 1, 1929

15 Claims. (Cl. 106—22)

Our invention relates to artificial substances.

We have discovered the fact that valuable artificial substances can be obtained from solutions of polymerized acrylic acid, or polymerized derivatives of acrylic acid, or mixtures thereof, either by themselves or in combination with other suitable substances, for the production of compositions suitable for films or coatings, e. g. lacquer.

We have further discovered that special advantages can be obtained, if to the solutions of acrylic acid or its derivatives, or their mixtures, either prior or subsequent to the polymerization, substances are added of such a nature to increase the viscosity of the solutions. Such additional substances may, for example, be phthalic acid ester, acetin, or the like.

Further, we have found that when such additional viscosity increasing substances are used, it is advantageous to add to the starting materials compounds of analogous structure, e. g. methyl acrylic acid ester, acetic acid vinyl ester or their polymerized products.

These mixtures are principally distinguished by an especially great penetration resistance power.

Because of this quality, the artificial substance is eminently suited to be employed in many various ways either by itself or in combination with other susbtances, for instance as intermediate layers in compound bodies.

The following examples are given:

Example 1

60 parts of polymeric acrylic acid allyl ester are mixed with 5 parts of monoacetin.

Example 2

60 parts of polymeric acrylic acid methyl ester are in a suitable manner mixed with 30 parts of polymeric vinyl acetate, 10 parts of phthalic acid amyl ester and 3 parts of phthalic acid methyl glycol ester.

We claim:

1. A film formed from a solution of polymeric acrylic acid methyl ester and polymeric vinyl acetate in admixture with phthalic acid amyl ester and phthalic acid methyl glycol ester, the acrylic acid ester being used in excess of the phthalic acid esters.

2. A compound body including an intermediate film having high resistance to mechanical penetration, said intermediate film being formed from a solution of a polymerized acrylic acid ester in admixture with one of the group consisting of acetin and esters of phthalic acid.

3. A film derived from a solution of a polymerized aliphatic ester of acrylic acid in admixture with one of the group consisting of acetin and esters of phthalic acid.

4. A film derived from a solution of a polymerized aliphatic ester of acrylic acid and a polymerized aliphatic ester of a homologue of acrylic acid in admixture with one of the group consisting of acetin and esters of phthalic acid.

5. A film derived from a solution of a polymerized aliphatic ester of acrylic acid and a polymerized aliphatic ester of methacrylic acid in admixture with one of the group consisting of acetin and esters of phthalic acid.

6. A film derived from a solution of a polymerized aliphatic ester of acrylic acid and a polymerized vinyl compound in admixture with one of the group consisting of acetin and esters of phthalic acid.

7. A film derived from a solution of a polymerized aliphatic ester of acrylic acid, a polymerized aliphatic ester of a homologue of acrylic acid and a vinyl compound in admixture with one of the group consisting of acetin and esters of phthalic acid.

8. A film derived from a solution of a polymerized aliphatic ester of acrylic acid and polymerized vinyl acetate in admixture with one of the group consisting of acetin and esters of phthalic acid.

9. A film derived from a solution of a polymerized aliphatic ester of acrylic acid and a polymerized aliphatic ester of a derivative of acrylic acid in admixture with one of the group consisting of acetin and esters of phthalic acid.

10. A compound body including an intermediate film having high resistance to mechanical penetration, said intermediate film being formed from a solution of a polymerized aliphatic ester of acrylic acid and a polymerized aliphatic ester of methacrylic acid in admixture with one of the group consisting of acetin and esters of phthalic acid.

11. A compound body including an intermediate film having high resistance to mechanical penetration, said intermediate film being formed from a solution of a polymerized methyl acrylate in admixture with one of the group consisting of acetin and esters of phthalic acid.

12. A compound body including an intermediate film having high resistance to mechanical penetration, said intermediate film being formed from a solution of a polymerized aliphatic ester of acrylic acid in admixture with one of the group consisting of acetin and esters of phthalic acid.

13. A composition of matter comprising a polymerized ester of acrylic acid and a polymerized ester of methacrylic acid.

14. A compound body including an intermediate film comprising a polymerized ester of acrylic acid and a plasticizer.

15. A plastic mass comprising the product of joint polymerization of a methacrylic acid ester and an acrylic acid ester.

OTTO RÖHM.
WALTER BAUER.